INVENTOR
HENRY F SHANNON.

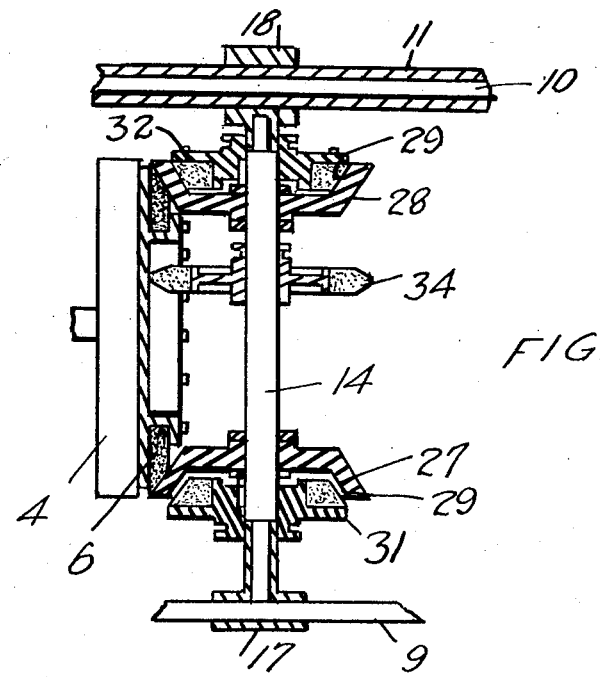
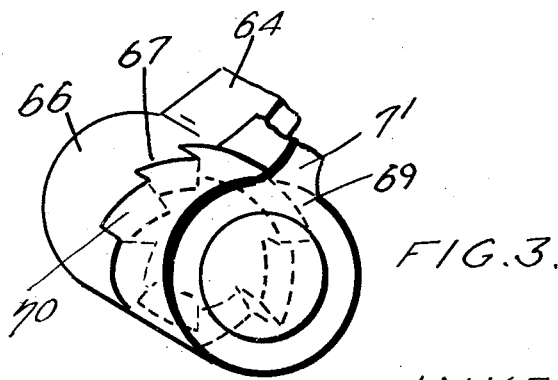

UNITED STATES PATENT OFFICE.

HENRY FAUCETT SHANNON, OF MEGEE, SASKATCHEWAN, CANADA.

TRANSMISSION.

1,394,122.  Specification of Letters Patent.  Patented Oct. 18, 1921.

Application filed May 3, 1920. Serial No. 378,535.

*To all whom it may concern:*

Be it known that I, HENRY FAUCETT SHANNON, a subject of the King of Great Britain, residing at Megee, in the Province of Saskatchewan, Canada, have invented certain new and useful Improvements in Transmissions, of which the following is the specification.

My invention relates to improvements in transmissions and the object of the invention is to devise a friction gear transmission particularly adapted for heavy class of machinery in which the speed variations may be readily controlled, in which the frictional driving contact may be increased during starting or when increased driving contact is desired when driving up hill and it consists of the arrangement and construction of parts as hereinafter more particularly explained.

Fig. 3 is a perspective detail of the co-acting sleeves whereby increased driving contact is produced.

Fig. 4 is an enlarged sectional detail through one set of friction gears.

In the drawings like characters of reference indicate corresponding parts in the various figures.

Figure 1:
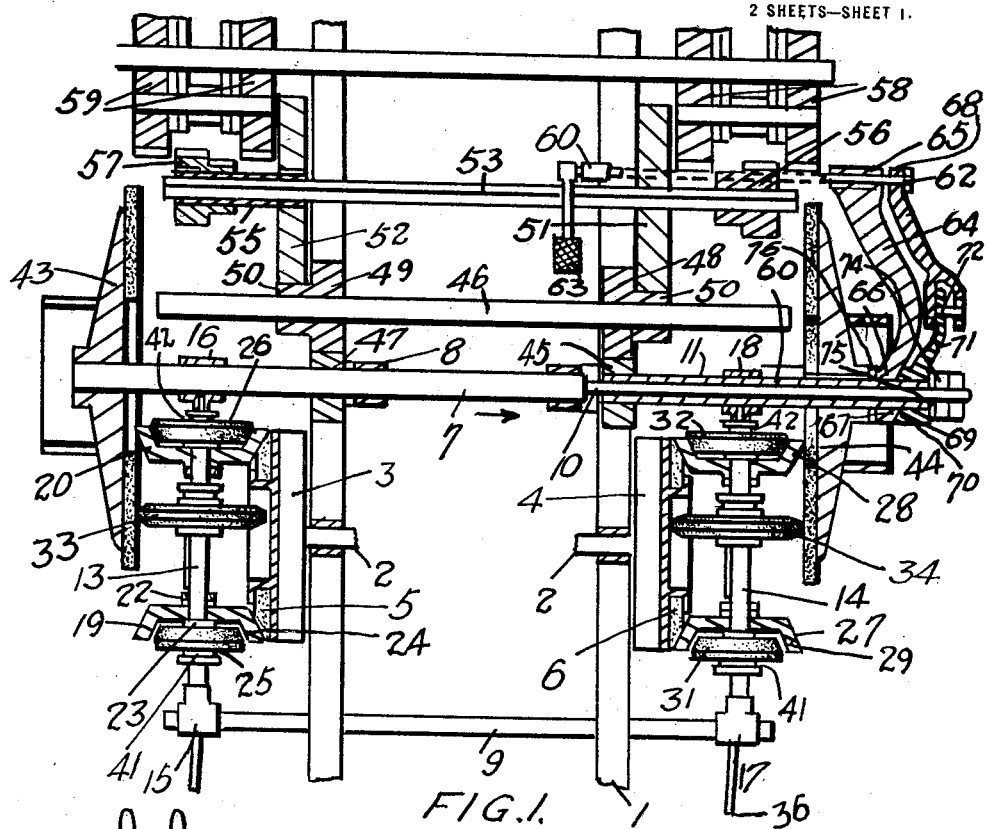
Figure 1 is a sectional plan view of my transmission.
Figure 2:
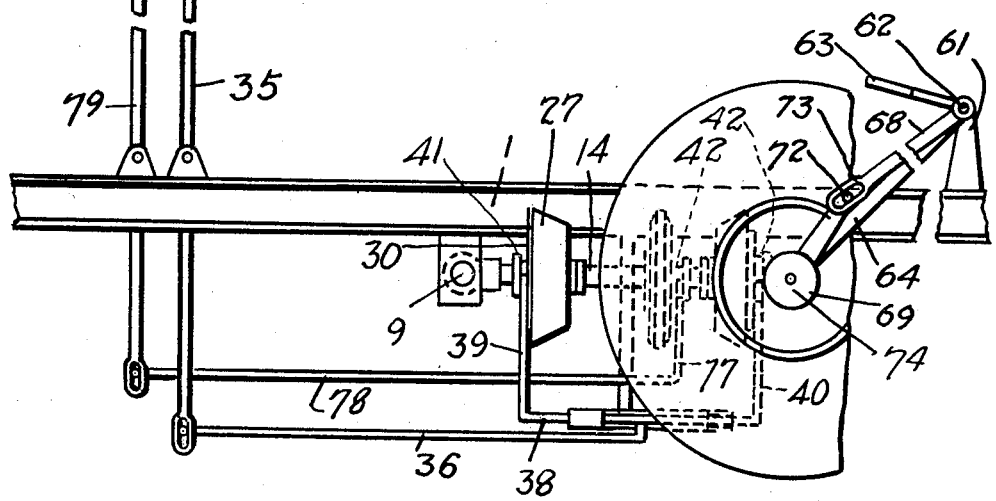
Fig. 2 is a side elevation showing the control levers controlling my transmission.

1 indicates the frame of a vehicle, 2 the engine shaft and 3 and 4 the fly wheels. 5 and 6 are friction beveled gears carried by the fly wheels. 7 is a shaft journaled in bearings 8 carried by the main frame. The shaft 7 is provided with a reduced portion 10 on which is mounted a sleeve 11. 13 and 14 are shafts the shaft 13 being provided with sleeved end bearings 15 and 16 mounted respectively upon the rod 9 and shaft 7. The shaft 14 is provided with sleeved end bearings 17 and 18 mounted respectively upon the rod 9 and sleeve 11.

19 and 20 are beveled gears mounted upon the shaft 13 in contact with the beveled gear 5. The beveled gears 19 and 20 are idler gears and which are held in position by collars 22 and 23. Each gear 19 and 20 is also provided with a conical recess 24 forming a female member of the friction clutch. 25 and 26 are male members of the clutch which are feathered upon the shaft 13. Upon the shaft 14 are mounted beveled gears 27 and 28 and which are also provided with female clutch recesses 29. 31 and 32 are male clutch members corresponding to the clutch members 25 and 26. 33 and 34 are friction wheels feathered to the shafts 13 and 14 so as to be slidable longitudinally thereof. The male clutch members 25 and 26 and the male clutch members 31 and 32 are each controlled by a lever 35 mounted upon the main frame and connected by the rod 36 to the rod 38 carrying forks 39 and 40 engaging the clutch grooves 41 and 42.

It will be seen by operating the levers 35 that the clutch members 31 and 32 on one side of the machine and the clutch members 25 and 26 on the opposite side of the machine are alternately thrown in and out of engagement with the clutch recesses 29 and 24.

43 is a face friction gear which is secured to the shaft 7 so as to contact with the periphery of the friction gear 33. 44 is an opposing face gear mounted upon a sleeve 11 having a feathered key connection thereto. 45 is a gear secured to the inner end of the sleeve 11. 47 is a gear secured to the shaft 10. 46 is a shaft. 48 and 49 are gears mounted on the shaft 46 in mesh with the gears 45 and 47. Each gear 48 and 49 is provided with a gear pinion 50 formed integral therewith and with which meshes gear wheels 51 and 52. The gear wheel 51 is mounted upon a squared shaft 53 and the gear 52 is secured to the sleeve 55 mounted upon the shaft 53. 56 is a two-speed pinion slidably mounted upon the shaft 53 and 57 is a two-speed pinion secured to the sleeve 55. The two-speed pinion 56 co-acts with the double gear 58 and the two-speed pinion 57 with the double gear 59 which is slidably connected to the driving wheels of the tractor or other vehicle to which my transmission is adapted.

When starting up the engine so as to drive the vehicle it is necessary to have increased frictional contact to overcome inertia. In order to do this I have provided means for simultaneously driving the face friction gears 43 and 44 inward into closed driving contact with the gears 33 and 34. In order to accomplish this I have provided the following mechanism.

60 is a sleeve bearing which is carried by the bearing bracket 61 supported upon the main frame of the machine. 62 is a rocking rod journaled in the sleeve bearing and on the inner end of which is mounted a foot lever 63. 64 is an arm provided with a sleeved end 65 which is mounted upon the rod 62 and provided at its opposite end with a collar 66 surrounding the sleeve 11. The collar 66 is provided with an external face ratchet 67 for a purpose which will hereinafter appear. 68 is an arm rigidly secured to rod 62. 69 is a collar which surrounds the sleeve 11 and is provided with an internal ratchet face 70 opposing the ratchet face 67. The collar 69 is provided with an arm 71 provided with a pin 72 extending into the slotted end 73 of the arm 68. 74 are nuts secured upon the reduced end of the shaft 7. 75 is a washer located between the nut 74 and collar 69 and 76 is a washer extending between the collar 66 and hub of the face friction gear 44.

It will be readily understood that when it is necessary to increase the frictional driving contact that all that it is necessary to do is to press upon the foot lever 63 turning the rod 62, to swing the arm 68 downward. By this means the collar 69 is turned upon the sleeve 11 so that its internal ratcheted face 70 is rotated in contact with the opposing ratcheted face 67 of the stationary collar 66. By this means the outer face of the collar 69 is forced against the washer 75 and nut 74 drawing the shaft 7 and the face gear 43 inward into contact with the friction gear 33 and in the direction of arrow (see Fig. 1). By the same movement the collar 66 is forced against the washer 76 forcing the friction gear 47 inward into contact with the gear 34. By this means increased driving contact is provided at any time desired such as when starting the vehicle or when going up hill.

By operating the lever 35 the gears 27 and 28 and 19 and 20 may be thrown in and out of operation so as to either reverse the drive or provide a compensating effect adapted to turn the vehicle either to the right or to the left. In order to increase or decerease the speed at which the vehicle is driven the gears 33 and 34 are provided with annular grooves with which a fork 77 engages carried by the rod 78 controlled by the lever 79. By this means the gears 33 and 34 may be shifted radially with the gears 43 and 44 to any desired position to vary the drive from a minimum to a maximum speed.

It will be radially seen that from such a transmission as I have described there will be extreme flexibility of drive. The two speed pinions 56 and 57 are forced into a neutral position when the friction face gears 43 and 44 are used for belt driving purposes. When they are used for driving under ordinary conditions the pinion 56 and 57 are in engagement with the outer portion of the gears 58 and 59. When a very slow drive is required they are carried into gear with the inner portions of the gears 58 and 59 and the transmission is then particularly adapted for use in such cases where house moving is required. In such a transmission as I have devised there is no danger of slippage as the friction faces may be drawn into close contact so as to overcome any tendency to slippage that there may be.

It will, or course, be understood that the gears 58 and 59 are utilized and suitably gear connected to drive either the ordinary drive wheels of a vehicle or the caterpillar drives which may be employed.

From this description it will be seen that I have provided a friction drive which will overcome all the defects of compensating mechanism by providing a positive drive to each side of the machine and which is of particular advantage in heavy classes of machine, in which the speed may be varied to any desired degree to produce any speed desired and which may be controlled by the operator so as to increase the friction contact at any desired time.

What I claim as my invention is—

1. In a transmision, the combination with the engine shaft and fly wheel mounted upon each end of the engine shaft, of beveled friction gears secured to the outer face of each fly wheel, counter shafts mounted at each end of the engine shaft, opposing beveled gears mounted upon each counter shaft and engaging with the beveled gears of the fly wheels at diametrically opposite points, clutch mechanisms for engaging the counter shaft, beveled gears engaging alternately with the counter shafts, a peripheral friction gear feathered upon each counter shaft and face friction gears rotatably mounted upon a suitable supporting shaft in engagement with the peripheral friction gears and means for transmitting motion from the face gears to the point desired.

2. In a transmission, the combination with the engine shaft and fly wheels mounted upon each end of the engine shaft, of beveled friction gears secured to the outer face of each fly wheel, counter shafts mounted at each end of the engine shaft, opposing beveled gears mounted upon each counter shaft and engaging with the beveled gears of the fly wheel at diametrically opposite points, clutch mechanisms for engaging the counter shaft, beveled gears engaging alternately with the counter shafts, a peripheral friction gear feathered upon each counter shaft and face friction gears rotatably mounted upon a suitable supporting shaft in engagement with the peripheral friction gears, and means for drawing the face gears inward into closer driving contact with the peripheral friction gears.

3. In a transmission, the combination with the engine shaft and fly wheels mounted upon each end of the engine shaft, of beveled friction gears secured to the outer face of each fly wheel, counter shafts mounted at each end of the engine shaft, opposing beveled gears mounted upon each counter shaft and engaging with the beveled gears of the fly wheels at diametrically opposite points, clutch mechanisms for engaging the counter shaft, beveled gears engaging alternately with the counter shafts, a peripheral friction gear feathered upon each counter shaft, a shaft journaled in suitable bearings and having a reduced portion, a sleeve mounted upon the reduced portion of the shaft, a face friction gear secured to one end of the shaft in contact with one of the peripheral friction gears, a face friction gear feathered to the sleeve mounted upon the reduced portion of the shaft, means for transmitting the power generated from the shaft and from the sleeve to the driving wheels of the vehicle and means operated by the driver for drawing the shaft of the face gears in one direction and the sleeve mounted thereon in the opposite direction so as to carry the opposing face gears toward each other and into closer contact with the peripheral friction gears.

4. In a transmission, the combination with the engine shaft and fly wheels mounted upon each end of the engine shaft, of beveled friction gears secured to the outer face of each fly wheel, counter shafts mounted at each end of the engine shaft, opposing beveled gears mounted upon each counter shaft and engaging with the beveled gears of the fly wheels at diametrically opposite points, clutch mechanisms for engaging the counter shaft, beveled gears engaging alternately with the counter shafts, a peripheral friction gear feathered upon each counter shaft, a shaft journaled in suitable bearings and having a reduced portion, a sleeve mounted upon the reduced portion of the shaft, a face friction gear secured to one end of the shaft in contact with one of the peripheral friction gears, a face friction gear feathered to the sleeve mounted upon the reduced portion of the shaft, means for transmitting the power generated from the shaft and from the sleeve to the driving wheels of the vehicle, an enlargement formed upon the end of the reduced portion of the shaft, a collar carried by the sleeve and bearing against the outer face of one of the face friction gears and having a ratcheted opposite face, a collar also mounted upon the sleeve having a ratcheted face opposing the aforesaid ratcheted face of the aforesaid collar and bearing at its opposite face against the enlargement formed at the end of the reduced portion of the shaft and means operated by the driver for turning the collar in contact with the shaft enlargement so as to spread the ratcheted faces apart.

5. In a transmission, the combination with the engine shaft and fly wheels mounted upon each end of the engine shaft, of beveled friction gears secured to the outer face of each fly wheel, counter shafts mounted at each end of the engine shaft, opposing beveled gears mounted upon each counter shaft and engaging with the beveled gears of the fly wheels at diametrically opposite points, clutch mechanisms for engaging the counter shaft, beveled gears engaging alternately with the counter shafts, a peripheral friction gear feathered upon each counter shaft, a shaft journaled in suitable bearings and having a reduced portion, a sleeve mounted upon the reduced portion of the shaft, a face friction gear secured to one end of the shaft in contact with one of the peripheral friction gears, a face friction gear feathered to the sleeve mounted upon the reduced portion of the shaft, means for transmitting the power generated from the shaft and from the sleeve to the driving wheels of the vehicle, an enlargement formed upon the end of the reduced portion of the shaft, a collar carried by the sleeve and bearing against the outer face of one of the face friction gears and having a ratcheted opposite face, a rocking shaft journaled in suitable bearings, a foot lever secured to one end of the shaft, a sleeve mounted freely upon the rocking shaft, an arm connecting such sleeve with the ratcheted collar contacting with the face friction gear, an arm secured to the rocking shaft and means operated by the arm, a collar also mounted upon the sleeve and having a ratcheted face opposing the ratcheted face of the aforesaid collar on one side and against the enlargement of the reduced portion of the shaft on the other side and means operated by the rocking shaft arm for turning the collar in engagement with the enlargement in relation to the collar engaging with the face friction gear.

6. In a transmission drive, the combination with the engine shaft, a beveled friction gear carried at each end of the engine shaft, a counter shaft located adjacent to each beveled gear, beveled pinions mounted upon each counter shaft and engaging with the beveled gears of the engine shaft at diametrically opposite points, clutch means for throwing the beveled gears of each counter shaft alternately in and out of engagement therewith, opposing face friction gears rotatably mounted upon the vehicle frame, peripheral frictional gears co-acting therewith and feathered to each counter shaft, a supplemental shaft, a two speed pinion mounted at one end of the supplemental shaft, a sleeve slidably mounted upon the opposite end of the supplemental shaft, a gear connection between the supplemental shaft and the face friction gears, and co-acting two speed pinions and double speed gears co-acting with each two speed pinion and spaced apart so that the two speed pinion may be held in neutral between the same.

HENRY FAUCETT SHANNON.